(12) United States Patent
McEwen

(10) Patent No.: US 7,210,295 B2
(45) Date of Patent: May 1, 2007

(54) COMPRESSOR WITH SECONDARY BOOST AIR OUTLET PASSAGE

(75) Inventor: James Alexander McEwen, Brighouse (GB)

(73) Assignee: Holset Engineering Company, Ltd., Huddersfield (GB)

(*) Notice: Subject to any disclaimer, the term of this patent is extended or adjusted under 35 U.S.C. 154(b) by 0 days.

(21) Appl. No.: 10/860,619

(22) Filed: Jun. 3, 2004

(65) Prior Publication Data
US 2004/0255581 A1 Dec. 23, 2004

(30) Foreign Application Priority Data
Jun. 11, 2003 (GB) .................. 0313399.8

(51) Int. Cl.
F02D 23/00 (2006.01)
F04D 25/04 (2006.01)
F02B 33/00 (2006.01)
F02B 37/12 (2006.01)

(52) U.S. Cl. .................. 60/602; 415/144; 415/145; 415/163; 415/164; 415/38

(58) Field of Classification Search .................. 60/602; 415/144–145, 158, 163–164, 38
See application file for complete search history.

(56) References Cited

U.S. PATENT DOCUMENTS

| 4,171,936 A | 10/1979 | Hageman et al. ............. 60/602 |
| 4,311,008 A | 1/1982 | Yamada ........................ 60/602 |
| 4,629,394 A * | 12/1986 | Leachman, Jr. .............. 415/38 |
| 4,655,043 A | 4/1987 | McInerney .................... 60/602 |
| 6,155,048 A | 12/2000 | Vertanen ....................... 60/602 |
| 6,205,784 B1 | 3/2001 | Knaack et al. ................ 60/602 |
| 6,405,535 B1 * | 6/2002 | McEwan ....................... 60/602 |
| 6,729,134 B2 * | 5/2004 | Arnold et al. ................ 60/602 |
| 2003/0115870 A1 * | 6/2003 | Finger et al. ................. 60/602 |

FOREIGN PATENT DOCUMENTS

| GB | 2 036 185 | 6/1980 |
| JP | 63-205419 | 8/1988 |

* cited by examiner

Primary Examiner—Thai-Ba Trieu
(74) Attorney, Agent, or Firm—Krieg DeVault, LLP; J. Bruce Schelkopf, Esq.

(57) ABSTRACT

A wastegated turbocharger includes a turbine wheel mounted to a shaft for rotation within a turbine housing and a compressor wheel mounted to the shaft for rotation within a compressor housing. The compressor housing has mounted thereto a wastegate actuator command valve. A secondary boost air outlet passage is disposed in fluid flow communication with the wastegate actuator command valve and the compressor outlet volute. The secondary boost air outlet passage extends into the compressor outlet volute so that an inlet opening of the passage is spaced from the surface of the compressor outlet volute.

20 Claims, 6 Drawing Sheets (PRIOR ART)

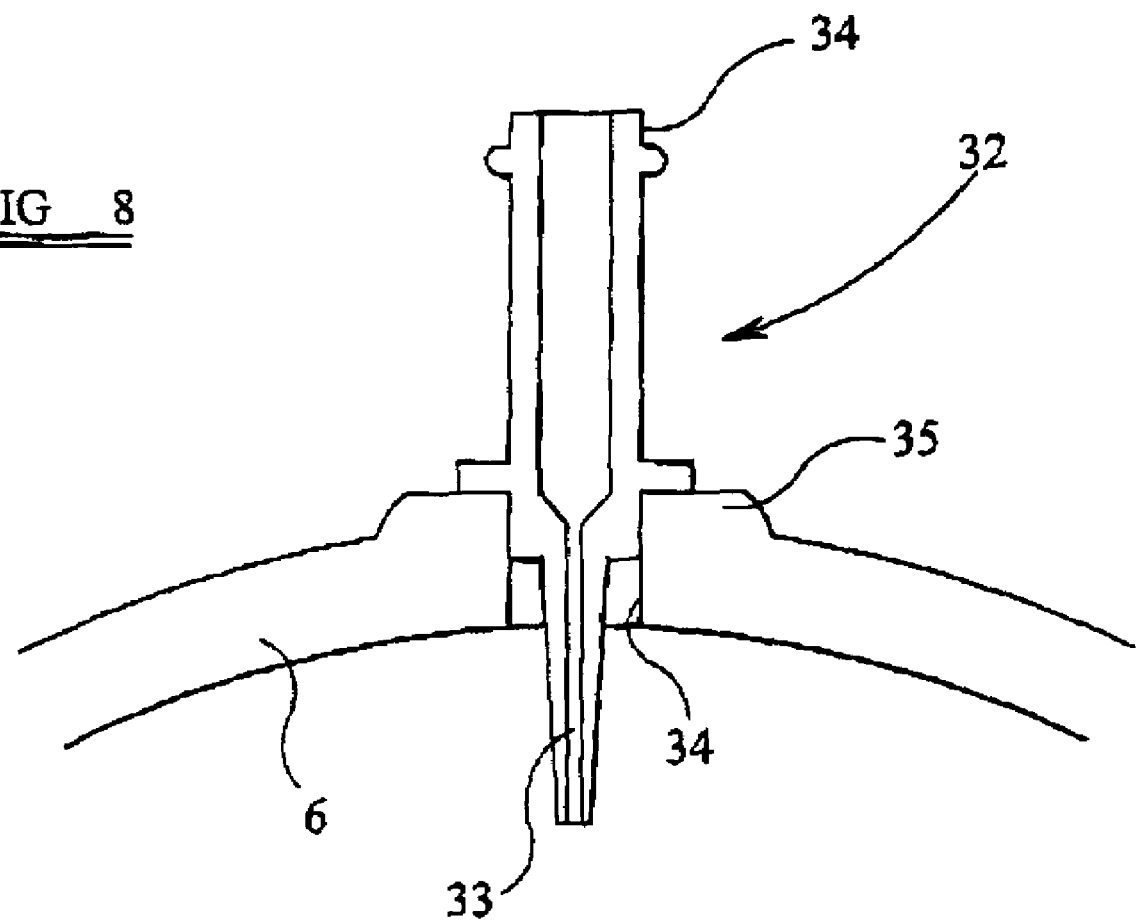

COMPRESSOR WITH SECONDARY BOOST AIR OUTLET PASSAGE

The present application claims priority to British Patent Application No. 0313399.8 filed Jun. 11, 2003, which is incorporated herein by reference.

This invention relates to a compressor with a secondary boost air outlet. A compressor may be used to compress gases other than air, and the present invention is not limited to a compressor which compresses only air. The term "air" as used throughout this specification should therefore be interpreted as covering any gas. The invention relates in particular to a turbocharger incorporating a wastegate and pneumatic wastegate actuator, and more particularly to a command valve arrangement for controlling the operation of the wastegate actuator.

BACKGROUND OF THE INVENTION

Turbochargers are well known devices for supplying air to the intake of an internal combustion engine at pressures above atmospheric (boost pressures), and are widely used in automobiles and the like as well as in industrial applications. A conventional turbocharger essentially comprises an exhaust gas driven turbine wheel mounted on a rotatable shaft within a turbine housing. For instance, in a centripetal turbine the turbine housing defines an annular inlet passageway around the turbine wheel and a generally cylindrical axial outlet passageway extending from the turbine wheel. Rotation of the turbine wheel rotates a compressor wheel mounted on the other end of the shaft within a compressor housing. The rotating compressor wheel compresses inlet air and delivers the compressed air to the intake manifold of the engine, thereby increasing engine power.

It is also well known to provide turbochargers with a bypass passageway between the exhaust inlet and the exhaust outlet portions of the turbine housing to enable control of the turbocharger boost pressure and/or shaft speed. A wastegate valve is located in the bypass passageway and is controlled to open the passageway when the pressure level of the boost air increases towards a pre-determined level, thus allowing some of the exhaust gas to by-pass the turbine wheel preventing the boost pressure from rising above said level. The wastegate valve is generally actuated by a pneumatic actuator operated by boost air pressure delivered by the compressor wheel.

The conventional pneumatic actuator comprises a spring-loaded diaphragm (or a spring loaded sliding seal) housed within a canister, often referred to as the wastegate actuator can. The actuator can is connected by an airline to the compressor outlet and is generally mounted on the compressor housing. Communication with the compressor outlet is via a secondary boost air outlet passage such as a port formed in the compressor housing. The diaphragm/sliding seal acts on a connecting rod which extends to the wastegate valve assembly which is mounted in the turbine housing. The spring bias is such that under low boost pressure conditions the wastegate valve remains closed. However, when the boost pressure (which is transmitted to the actuator can from the compressor outlet via the secondary boost air outlet and the airline) reaches a predetermined maximum the diaphragm is moved against the action of the spring and operates to open the wastegate valve (via the connecting rod) thereby allowing some exhaust gas to bypass the turbine wheel.

The actuator can is generally connected to the compressor outlet by a flexible hose. In many cases the connection is direct. However, it is also known to provide a bleed valve, also referred to as a command valve, in the airline which responds to appropriate control signals (for instance from the engine management system) to effectively vary the pressure transmitted to the wastegate actuator can by venting to atmosphere. This provides for additional control of the wastegate valve over and above the basic operation dependent upon the pre-determined spring bias. For instance, the command valve may be operated to effectively modify the pressure at which the wastegate valve will begin to open which may be desirable in certain engine operating conditions.

Wastegate actuator control is not the only situation in which it is necessary to extract boost air from the outlet of a compressor via a secondary boost air outlet passage. For instance, one conventional method of preventing compressor surge is to install a solenoid valve in an air line ported to the compressor outlet via a secondary boost air outlet passage to controllably vent boost air from the outlet under conditions at which the compressor is likely to surge. The vented air may typically be vented to atmosphere via a silencer or returned to the compressor inlet for re-circulation through the compressor.

Where a valve is used to control the boost air flow through the secondary boost air outlet passage, it is quite common to mount the valve at a location remote from the compressor. For instance, some valves are constructed largely from plastic and therefore must be mounted away from the turbocharger at a cool part of the engine. Inevitably, remote mounting of the valve (whatever its function) requires extra air lines and associated fittings. A solution to this problem is provided by Japanese patent application S62-35565 (laid-open patent application S63-205419 filed in February 1987). This discloses mounting a solenoid valve directly to the compressor housing in order to avoid extra air line connections between the valve and the compressor. The compressor housing is provided with an integral valve mount located on an outside surface of the housing and including a first air port in communication with the compressor outlet volute and a second air port in communication with the compressor air intake. The mount has means for attaching the solenoid valve and forming a leak-tight seal between the valve and the first and second air ports provided in the valve mount. In this particular instance, the solenoid valve is provided for surge prevention and thus operates to selectively control flow of boost air from the compressor outlet to the compressor inlet (via the first and second air ports respectively) to avoid surge. Exactly the same valve mounting arrangement has been used for mounting a wastegate actuator command valve, see for instance U.S. Pat. No. 6,205,784.

A problem with the known arrangements for extracting air from a compressor outlet via a secondary boost air outlet passage is that any oil, dirt etc present in the air is fed to the downstream component (such as a valve or wastegate actuator) which over time can compromise the operation of the component. For instance, valve ports can become at least partially clogged by the build-up of oil and particulate material present in the boost air. This can be particularly problematical where the compressor is part of a turbocharger fitted to a combustion engine with a closed crank case ventilation system (CCV). Closed cranked case ventilation is becoming increasingly prevalent in order to meet modern stringent exhaust emission regulations.

It is an object of the present invention to obviate or mitigate the above disadvantages.

BRIEF SUMMARY OF THE INVENTION

According to a first aspect of the present invention there is provided a compressor for compressing a gas, the compressor comprising a compressor wheel rotatably mounted within a compressor housing, the compressor housing having a gas inlet and having a gas outlet volute disposed around the compressor wheel, and defined by an inner surface or surfaces of the housing, for supplying gas at boost pressures, a secondary boost gas outlet passage provided in communication with the outlet volute, wherein the secondary boost gas outlet passage is defined at least in part by a projection which extends into the volute so that the upstream end of the passage opens at a location spaced from the volute surface.

By locating the inlet of the secondary boost gas passage away from the surface of the volute the amount of oil/dirt etc passing into the passage can be reduced or eliminated entirely. This is because the oil/dirt etc is centrifuged to the volute surface by the gas flow swirling through the volute and the air flow away from the surface is clean.

According to a second aspect of the present invention there is provided a wastegated turbocharger comprising:

a turbine wheel mounted to a shaft for rotation within a turbine housing, the turbine housing provided with a wastegate valve assembly;

a compressor wheel rotatably mounted to said shaft for rotation within a compressor housing, the compressor housing having an intake air inlet and an intake air outlet volute for supplying air to an internal combustion engine at boost pressures;

a pneumatic wastegate actuator connected by a boost airline to the compressor intake outlet;

wherein the compressor housing is provided with a command valve mount for directly mounting a wastegate actuator command valve to the compressor housing, the command valve in use operating to selectively vent said boost airline for controlling operation of the wastegate actuator;

the compressor housing defining a first internal passage communicating between the valve mount and the compressor outlet volute, and a second internal passage communicating between the valve mount and the compressor intake inlet;

wherein the first passage is defined at least in part by a projection which extends into the volute so that the upstream end of the passage opens at a location spaced from the volute surface.

According to a third aspect of the present invention there is provided a wastegated turbocharger comprising:

a turbine wheel mounted to a shaft for rotation within a turbine housing, the turbine housing provided with a wastegate valve assembly;

a compressor wheel rotatably mounted to said shaft for rotation within a compressor housing, the compressor housing having an intake air inlet and an intake air outlet volute for supplying air to an internal combustion engine at boost pressures;

a pneumatic wastegate actuator connected by a boost airline to the compressor intake outlet;

wherein a command valve is mounted to a valve mount provided integrally with the compressor housing, the command valve having a boost air inlet and a vent outlet for selectively venting the boost airline for controlling operation of the wastegate actuator, and wherein the compressor housing is provided with an internal boost air passage communicating directly between the compressor intake outlet and the valve boost air inlet, and a vent passage communicating directly between the valve vent outlet and the compressor intake inlet;

wherein the boost air passage is defined at least in part by a projection which extends into the volute so that the upstream end of the passage opens at a location spaced from the volute surface.

BRIEF DESCRIPTION OF THE DRAWINGS

Specific embodiments of the present invention will now be described, by way of example only, with reference to the accompanying drawings, in which:

FIGS. 5–8 are cross-sections through further embodiments of the present invention.

DETAILED DESCRIPTION OF THE INVENTION

Figure 1:
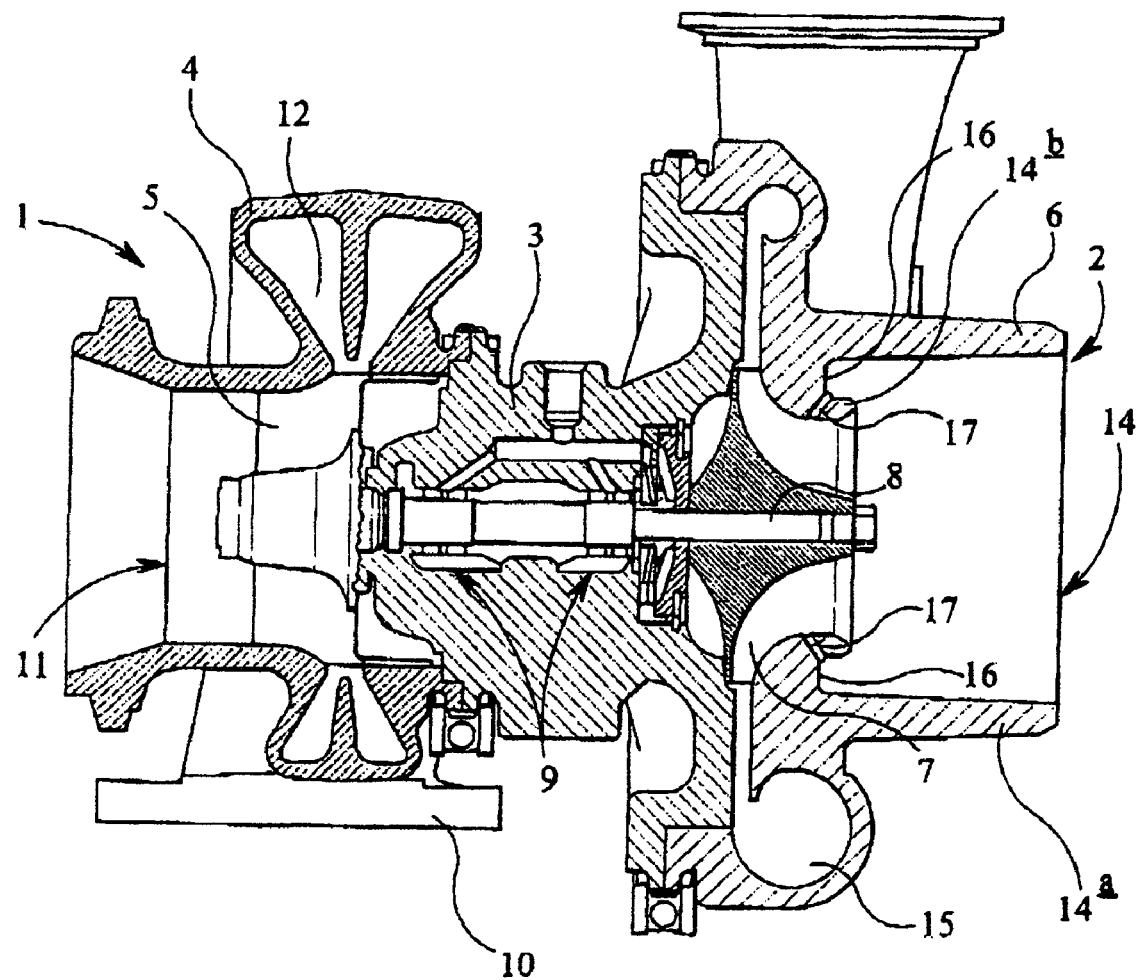
FIG. 1 is an axial cross-section through a conventional turbocharger illustrating the major components of a turbocharger.

Referring first to FIG. 1, this illustrates the basic components of a conventional centripetal type turbocharger. The turbocharger comprises a turbine 1 joined to a compressor 2 via a central bearing housing 3. The turbine 1 comprises a turbine housing 4 which houses a turbine wheel 5. Similarly, the compressor 2 comprises a compressor housing 6 which houses a compressor wheel 7. The turbine wheel 5 and compressor wheel 7 are mounted on opposite ends of a common shaft 8 which is supported on bearing assemblies 9 within the bearing housing 3.

The turbine housing 4 is provided with an exhaust gas inlet 10 and an exhaust gas outlet 11. The inlet 10 directs incoming exhaust gas to an annular inlet chamber 12 which forms a volute surrounding the turbine wheel 5. The exhaust gas flows through the turbine 1 and into the outlet 11 via a circular outlet opening 13 which is co-axial with the turbine wheel 5.

The compressor comprises an inlet 14 and an outlet volute 15 co-axial with the compressor wheel 7. As the compressor wheel rotates, air intake is drawn in through the inlet 14, compressed and delivered to the engine via outlet volute 15. The illustrated compressor 2 has a map width enhanced (MWE) inlet structure comprising two co-axial tubular inlet sections 14a and 14b. The inner inlet section 14b is shorter than the outer inlet section 14a and has an inner surface which is an extension of a surface of the inner wall of the compressor housing which faces the compressor wheel 7. The outer inlet portion 14a is located radially outside the inner inlet portion 14b to define an annular inlet passage 16 therebetween. Apertures 17 are formed through the housing at the downstream end of the outer inlet portion 14a and open into the inner surface of the compressor housing adjacent the compressor wheel 7. As the compressor wheel 7 rotates at high speed and flow conditions, intake air is drawn into the compressor housing through the inner inlet portion 14b and also through the annular passage 16 and apertures 17. However, as the mass flow through the compressor wheel 7 falls the pressure drop across the apertures 17 falls and eventually reverses, at which time the airflow direction in the annular passage 16 also reverses such that some of the air entering the housing through the inner inlet portion 14b is re-circulated. This stabilises the compressor performance in a well known way.

Figure 2:
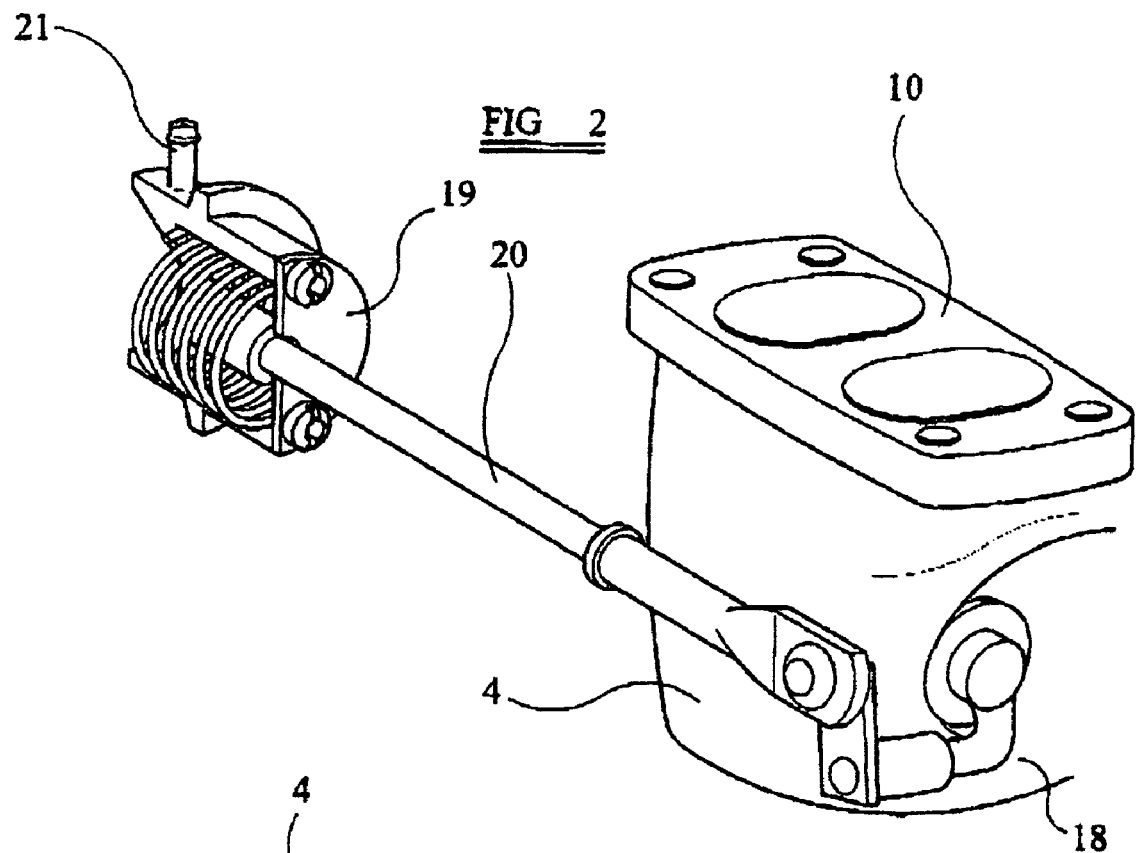
FIG. 2 illustrates details of a conventional turbocharger wastegate valve and actuator assembly.

Referring now to FIG. 2, this illustrates components of a conventional wastegate valve and wastegate actuator assembly which is not visible from FIG. 1. The turbine housing 4 is provided with a bypass passageway (not shown) which communicates between the exhaust inlet 10 and the exhaust outlet bypassing the turbine wheel. The bypass passageway communicates with the exhaust inlet 10 via a circular opening (not shown) which is opened and closed by a wastegate valve assembly 18 provided for controlling the flow therethrough. In FIG. 2 the part of the turbine housing 4 defining the inlet 10 is shown partially cut-away to reveal details of the wastegate valve assembly 18.

The wastegate valve assembly 18 is controlled by a pneumatic wastegate actuator 19 which is linked to the valve assembly 18 via a connecting rod 20. The wastegate actuator 19 receives compressed air from the outlet of the compressor 2 via an airhose (not shown) communicating with a secondary boost outlet passage (not shown) provided through the compressing housing with the outlet volute fitted to nipple 21 and communicating with a port (not shown) provided in the compressor housing. The wastegate actuator 19 is conventionally mounted to the outside of the compressor housing by an appropriate bracket (not shown). Details of the wastegate valve assembly 18, the wastegate actuator 19, and the mounting arrangements for securing the wastegate actuator 19 to the compressor are not important to an understanding of the present invention (and may be entirely conventional) and thus will not be described further.

Figure 3:
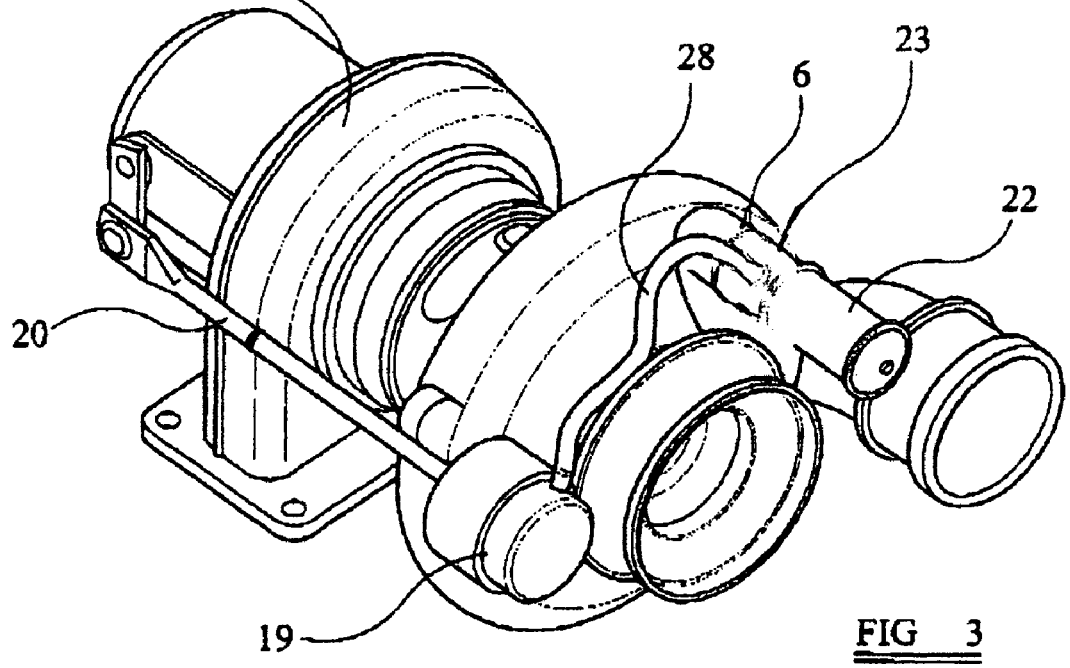
FIG. 3 is a schematic perspective external view of a turbocharger incorporating the present invention.

FIG. 3 is a perspective external illustration of a wastegated turbocharger fitted with a wastegate command valve 22 and incorporating the present invention. Common reference numerals are used to identify components shown in FIGS. 1 and 2.

Figure 4:
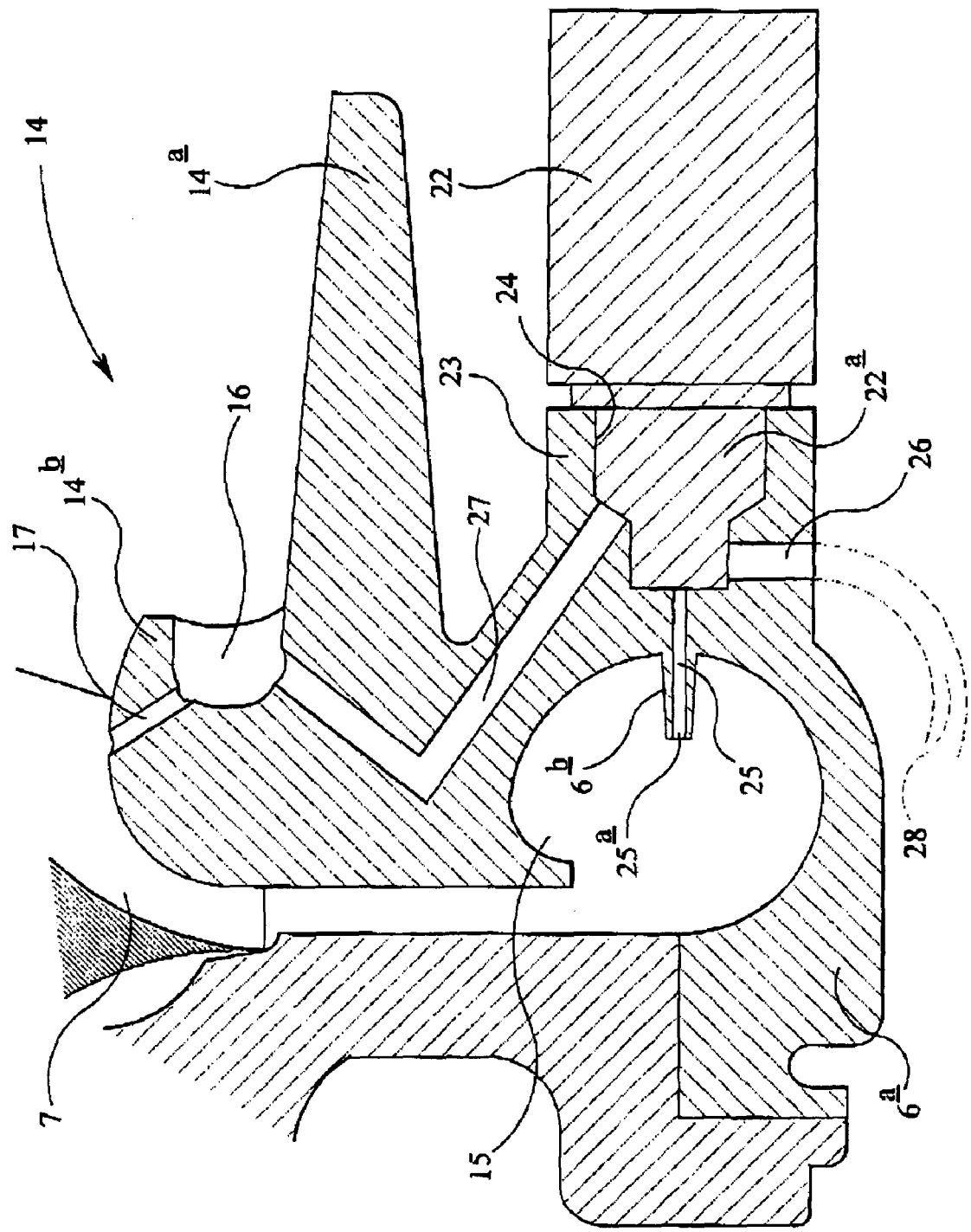
FIG. 4 is a cross-section through part of the turbocharger compressor housing and command valve assembly of FIG. 3.

Referring now to FIG. 4, this is an enlarged cross-section of part of the compressor housing of FIG. 3. The compressor housing, in this case the compressor cover 6a, is formed with a valve mounting boss 23 which defines an internal opening 24 for receiving one end 22a of the command valve 22 (as illustrated the valve end 22a is screwed into the boss 23 but other fixing arrangements may be provided to suit the form of valve 22).

The compressor cover 6a is provided with three internal bores 25, 26 & 27 which communicate with the boss opening 24 and with respective ports of the command valve 22. The first bore 25 is the secondary boost air outlet passage which communicates with the compressor outlet volute 15 to deliver boost air to the valve 22. The second bore 26 is a boost air supply passage and opens to the outer surface of the compressor cover 6a and is provided to supply boost air from the valve 22 to the wastegate actuator via an appropriate hose connection shown by chain dot lines 28. The third bore 27 is a boost air vent passage and communicates with the compressor inlet in the region of the annular inlet passage 16.

In accordance with the present invention, the secondary boost air outlet passage 25 projects into the outlet volute 15 so that the opening 25a at the upstream end of the passage 25 is spaced from the surface 15a of the volute 15. The inventor has found that this seemingly simple expedient significantly reduces, and even entirely eliminates, the passage of oil/dirt etc through the secondary boost passage 25. This is because any oil/dirt particles etc are centrifuged onto the volute wall 15a by the gas flow which swirls through the outlet volute 15. Accordingly, air flowing through the volute away from the volute surface 15a is cleaner than the air flow close to the volute surface 15a.

Each of the bores 26 and 27 maybe be formed by drilling through the compressor cover 6a and boss 24. In the illustrated example the boost air vent bore 27 is formed from two angled portions which may be drilled separately from within the compressor inlet and boss opening 24 respectively. It will, however, be appreciated that in other compressor housing designs it may be possible to provide a straight boost air vent bore between the command valve and the compressor inlet. Similarly, it will be understood that the bores 26 and 27 could be cast rather than drilled.

The command valve 22 is a conventional three port proportional solenoid valve which is operable to selectively connect the boost air inlet bore 25 with either the boost air outlet bore 26 or boost air vent bore 27 in response to an appropriate control signal (received from the engine management system or other appropriate sensor/control arrangement). The valve 22 may thus be operated in essentially the same manner as a conventional wastegate actuator command valve to control the boost air supply to the wastegate actuator in accordance with normal operating parameters. Since the valve itself may be entirely conventional, no details of any particular valve will be described, but it should be borne in mind that the valve must be capable of withstanding the relatively high temperature generated at the compressor and an appropriate valve should be selected accordingly.

Figure 5:
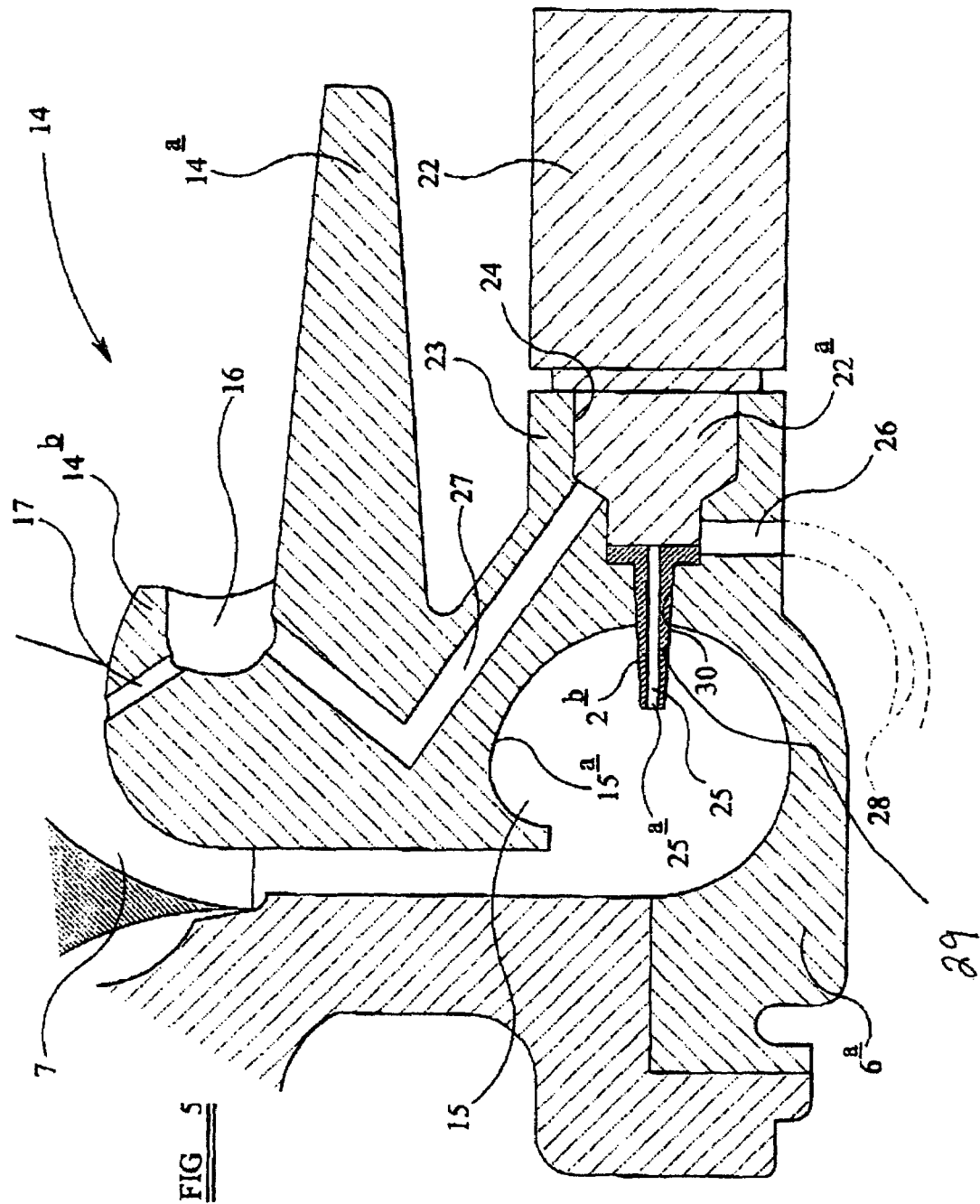

With the simple embodiment illustrated in FIG. 3, the projection into the volute 15 may be formed as an integral casting formation 6b with the compressor housing 6a. The bore 25 could either be cast or drilled post-casting. However, casting such a projection complicates the casting process and thus may add to manufacturing expense. One alternative is illustrated in FIG. 5. The structure illustrated in FIG. 5 is the same as that illustrated in FIG. 3 except that the secondary boost air outlet passage is defined by a member 29 which is fitted into the boss opening 24 and extends through an aperture 30 which may simply be drilled into the housing 6a through the bottom of the opening 24. FIG. 5 is only a schematic drawing, and it will be appreciated that additional features, such as annular seals etc, may be provided to prevent gas leaking between the aperture 30 and member 29.

Figure 6:
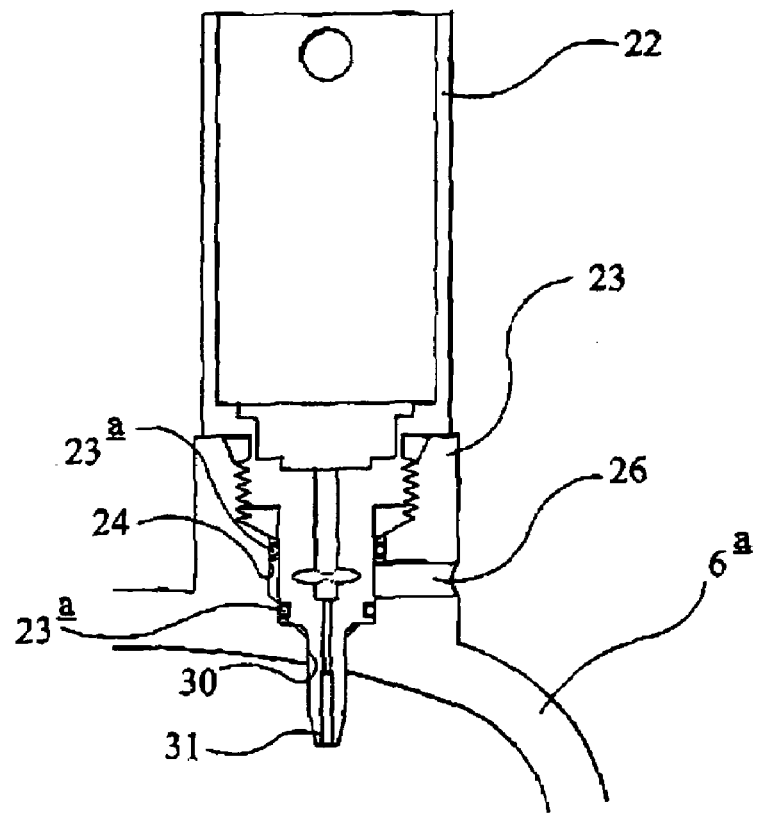
Figure 7:
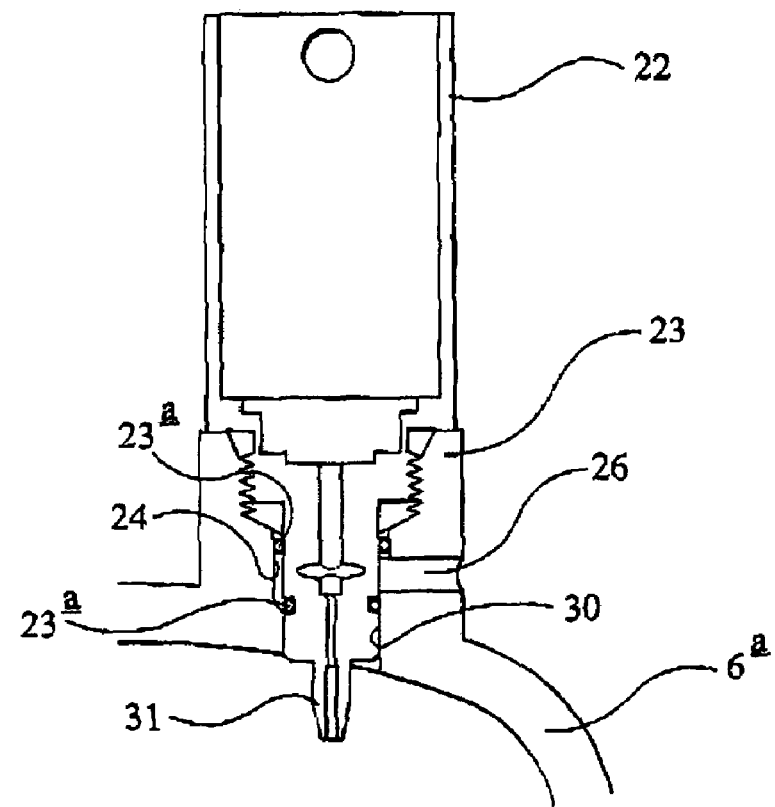

Two further alternatives are illustrated in FIGS. 6 and 7. In each case the valve 22 is modified by provision of an elongate nose or stem 31 (which is directly equivalent to the projecting portion 6b of FIG. 5) which extends through an aperture 30 when the valve is installed in the valve mounting boss 23 (vent port 27 is not visible in FIGS. 6 and 7). Also shown in FIGS. 6 and 7 are O-ring seals 23a provided to provide an air-tight seal between the valve 22 and mounting boss 23.

The embodiments of FIGS. 6 and 7 differ from one another in that in the embodiment of FIG. 7 the aperture 30 is sized to receive only the nose portion 31 of the valve whereas with the embodiment of FIG. 7 the aperture 30 is enlarged to receive a relatively large diameter end portion of the valve 22. The latter arrangement avoids the need for a separate drilling to form the aperture 30 which instead is formed by a drilling which defines a part of the boss opening 24.

It will be appreciated that modification may be made to the detail of the configuration of the valve mounting boss dependent upon the design of the command valve intended to be used and to the size and positioning of the boost air inlet, outlet and vent bores, as well as the precise location at which these bores open to the compressor inlet, outlet and outer surface of the compressor housing.

It will also be appreciated that the invention is not limited in application to any particular form of wastegate actuator or wastegate valve assembly but can be applied wherever a command valve is desirable to control operation of a pneumatic wastegate actuator. In addition, it will be understood that the command valve itself can be controlled in accordance with any conventional methods and engine performance parameters to provide the same control as a conventional wastegate actuator command valve.

Valves intended for other purposes may be installed and that the invention is not limited for use in application with wastegate actuator command valves. For instance, a valve operated to prevent compressor surge may be installed as suggested by the Japanese patent application mentioned in the introduction to this specification.

Furthermore, it should be appreciated that the present invention provides advantages even where the valve is located remote from the secondary boost air outlet passage. For instance, FIG. 8 schematically illustrates an adapter member 32 installed in an aperture 34 provided through a compressor housing 6. One end of the adapter 32 defines a secondary boost air outlet passage 33 which projects into the compressor volute 15, and the other end of the adapter 32 provides a fitting 34 for attachment of an air hose (not shown) for feeding the boost air to a remotely located valve. The adapter 32 is preferably screwed into the aperture 34, and in order to provide sufficiently long screw thread the compressor housing 6 is preferably formed with a boss 35 through which the aperture 34 is drilled.

Furthermore, the air need not necessarily be supplied to a downstream valve but could, for instance, be supplied directly to a wastegate actuator or other component.

Other modifications and applications of the invention will be readily apparent to the appropriately skilled person.

The invention claimed is:

1. A compressor for compressing a gas, the compressor comprising a compressor wheel rotatably mounted within a compressor housing, the compressor housing having a gas inlet and having a gas outlet volute disposed around the compressor wheel, and defined by an inner surface or surfaces of the housing, for supplying gas at boost pressures, a secondary boost gas outlet passage provided in communication with the outlet volute, wherein said secondary boost gas outlet passage is defined at least in part by a projection which extends into the volute so that the upstream end of the passage opens at a location spaced from the volute surface and said secondary boost gas passage communicates with a port of a downstream valve.

2. A compressor according to claim 1, wherein said projection is defined by a portion of the housing which projects in to the volute.

3. A compressor according to claim 1, wherein said projection is defined by a member which extends into the outlet volute through an aperture provided in a wall of the compressor housing.

4. A compressor according to claim 1, wherein said projection is defined by a projecting portion of a valve mounted directly to the compressor housing so that said projecting portion extends into the outlet volute through an aperture provided in the compressor housing.

5. A compressor according to claim 4, wherein the compressor housing is provided with the valve mount for directly mounting the valve to the compressor housing, said aperture opening into said valve mount, and an internal passage communicating between the valve mount and the compressor inlet, whereby the valve may operate to pass boost air from the secondary boost air outlet passage to the compressor inlet.

6. A compressor according to claim 1, wherein the compressor housing is provided with a valve mount for directly mounting the valve to the compressor housing, said secondary boost gas outlet passage opening into said valve mount, and an internal passage communicating between the valve mount and the compressor inlet, whereby the valve being operable to pass boost air from the secondary boost air outlet passage to the compressor inlet.

7. A compressor according to claim 6, wherein said valve mount is a boss provided on the compressor housing and defining an internal recess for receiving a portion of said valve.

8. A compressor for compressing a gas, the compressor comprising a compressor wheel rotatably mounted within a compressor housing, the compressor housing having a gas inlet and having a gas outlet volute disposed around the compressor wheel, and defined by an inner surface or surfaces of the housing, for supplying gas at boost pressures, a secondary boost gas outlet passage provided in communication with the outlet volute, wherein the secondary boost gas outlet passage is defined at least in part by a projection which extends into the volute so that the upstream end of the passage opens at a location spaced from the volute surface, wherein said projection is defined by a projecting portion of a valve mounted directly to the compressor housing so that said projecting portion extends into the outlet volute through an aperture provided in the compressor housing.

9. A compressor according to claim 8, wherein the compressor housing is provided with a valve mount for directly mounting the valve to the compressor housing, said aperture opening into said valve mount, and an internal passage communicating between the valve mount and the compressor intake inlet, whereby the valve may operate to pass boost air from the secondary boost air outlet passage to the compressor inlet.

10. A compressor according to claim 9, wherein said valve mount is a boss provided on the compressor housing and defining an internal recess for receiving a portion of said valve.

11. A compressor according to claim 10, wherein said secondary boost gas outlet passages opens into said internal recess for direct communication with a boost air inlet and a vent outlet of the valve respectively.

12. A compressor according to claim 10, wherein the compressor housing is provided with a third passage communicating with said internal recess and an outer surface of the compressor housing or boss for supplying boost air from said valve to a downstream component.

13. A compressor according claim 10, wherein said internal recess in the boss is threaded to receive a threaded end of said valve.

14. A compressor for compressing a gas, the compressor comprising a compressor wheel rotatably mounted within a compressor housing, the compressor housing having a gas inlet and having a gas outlet volute disposed around the compressor wheel, and defined by an inner surface or surfaces of the housing, for supplying gas at boost pressures, a secondary boost gas outlet passage provided in communication with the outlet volute, the secondary boost gas outlet passage is defined at least in part by a projection which extends into the volute so that the upstream end of the passage opens at a location spaced from the volute surface, wherein the compressor housing is provided with a valve mount for directly mounting a valve to the compressor housing, said secondary boost gas outlet passage opening into said valve mount, and an internal passage communicating between the valve mount and the compressor inlet, whereby the valve being operable to pass boost air from the secondary boost air outlet passage to the compressor inlet.

15. A compressor according to claim 14, wherein said projection is defined by a member which extends into the outlet volute through an aperture provided in a wall of the compressor housing.

16. A compressor according to claim 14, wherein said valve mount is a boss provided on the compressor housing and defining an internal recess for receiving a portion of said valve.

17. A compressor according to claim 16, wherein said secondary boost gas outlet passage opens into said internal recess for direct communication with a boost air inlet and a vent outlet of the valve respectively.

18. A compressor according to claim 16, wherein the compressor housing is provided with a third passage communicating with said internal recess and an outer surface of the compressor housing or boss for supplying boost air from said valve to a downstream component.

19. A wastegated turbocharger comprising:
   a turbine wheel mounted to a shaft for rotation within a turbine housing, the turbine housing provided with a wastegate valve assembly;
   a compressor wheel rotatably mounted to said shaft for rotation within a compressor housing, the compressor housing having an intake air inlet and an intake air outlet volute for supplying air to an internal combustion engine at boost pressures;
   a pneumatic wastegate actuator connected by a boost airline to the compressor intake outlet;
   wherein the compressor housing is provided with a command valve mount for directly mounting a wastegate actuator command valve to the compressor housing, the command valve in use operating to selectively vent said boost airline for controlling operation of the wastegate actuator;
   the compressor housing defining a first internal passage communicating between the valve mount and the compressor outlet volute, and a second internal passage communicating between the valve mount and the compressor intake inlet;
   wherein the first internal passage is defined at least in part by a projection which extends into the volute so that the upstream end of the passage opens at a location spaced from the volute surface.

20. A wastegated turbocharger comprising:
   a turbine wheel mounted to a shaft for rotation within a turbine housing, the turbine housing provided with a wastegate valve assembly;
   a compressor wheel rotatably mounted to said shaft for rotation within a compressor housing, the compressor housing having an intake air inlet and an intake air outlet volute for supplying air to an internal combustion engine at boost pressures;
   a pneumatic wastegate actuator connected by a boost airline to the compressor intake outlet;
   wherein a command valve is mounted to a valve mount provided integrally with the compressor housing, the command valve having a boost air inlet and a vent outlet for selectively venting the boost airline for controlling operation of the wastegate actuator, and wherein the compressor housing is provided with an internal boost air passage communicating directly between the air intake outlet and the valve boost air inlet, and a vent passage communicating directly between the valve vent outlet and the compressor intake inlet;
   wherein the internal boost air passage is defined at least in part by a projection which extends into the volute so that the upstream end of the passage opens at a location spaced from the volute surface.

* * * * *